United States Patent [19]
Shiao et al.

[11] Patent Number: 5,958,034
[45] Date of Patent: Sep. 28, 1999

[54] INDUCTIVE IMPEDANCE MODULATION OF TRANSMISSION LINES WITH STUB LOADS

[75] Inventors: Jack An-Kou Shiao, San Jose; C. John Grebenkemper, Saratoga; Frank Mikalauskas, San Jose, all of Calif.

[73] Assignee: Compaq Computer Corporation, Cupertino, Calif.

[21] Appl. No.: 08/935,038

[22] Filed: Sep. 22, 1997

[51] Int. Cl.[6] .................................................. G06F 13/00
[52] U.S. Cl. ........................ 710/126; 710/101; 710/100
[58] Field of Search .................................. 395/280, 281, 395/306, 309; 710/100, 101, 126, 129; 361/775; 333/238, 202; 330/54, 277; 257/531; 323/61

[56] References Cited

U.S. PATENT DOCUMENTS

| | | | |
|---|---|---|---|
| 3,955,134 | 5/1976 | Woodford | 323/61 |
| 3,992,686 | 11/1976 | Canning | 333/8 |
| 4,864,250 | 9/1989 | Bacon | 330/277 |
| 4,992,752 | 2/1991 | Cioffi | 330/54 |
| 5,117,331 | 5/1992 | Gebara | 361/407 |
| 5,164,757 | 11/1992 | Person et al. | 257/531 |
| 5,321,374 | 6/1994 | Uwano | 333/202 |

*Primary Examiner*—Ayaz R. Sheikh
*Assistant Examiner*—Ario Etienne
*Attorney, Agent, or Firm*—Fenwick & West LLP

[57] ABSTRACT

A method for manufacturing a bus having enhanced signals qualities which includes the steps of determining the intrinsic inductance per unit length ($L_0$) and intrinsic capacitance per unit length ($C_0$) of the unloaded bus. The method also includes the step of determining the load capacitance per unit length ($C_d$) of the bus that is attributable to the peripheral devices that will be attached to the bus. Based on these values, an adjustment inductance ($L_d$) per unit length for the bus is calculated for the bus with $L_d$ being substantially equal to $L_0 * C_d/C_0$. Finally, one inductor of value $L_d$ is added per unit length of the bus. The added adjustment inductance offsets the capacitance attributable to the peripheral devices attached to the bus. The result is that signals within the bus have rise and fall times acceptable for high speed operation.

16 Claims, 3 Drawing Sheets

INDUCTIVE IMPEDANCE MODULATION OF TRANSMISSION LINES WITH STUB LOADS

FIELD OF THE INVENTION

The present invention relates generally to busses for interconnecting electrical components included in computer systems and other electronic devices. More specifically, the present invention includes a method and apparatus for enhancing the electrical signal characteristics of busses by providing a means to maintain specified impedance levels even though the bus loading may vary.

BACKGROUND OF THE INVENTION

Busses are commonly used in computers and other electronic devices to send any number of signals from a driving point to a number of receiving points. These busses can be created in printed circuit technology or from cables attached from one point to another. Backplane busses use circuit cards that plug in at regular intervals and represent loads along the bus. Cable busses employ cables with uniform electrical parameters that are connected at load devices in a "daisy chain" fashion, such as in a SCSI bus implementation.

The SCSI type of bus is also adaptable for use within backplane architectures. In systems of this type, the cable bus is replaced with a printed circuit board backplane. Intelligent peripheral devices, in the form of daughter boards, are then connected to the backplane connectors. The backplane architecture provides a compact and efficient method for connecting a series of intelligent peripheral devices to a computer system.

To work properly, a bus must maintain certain electrical characteristics. One of these characteristics is a controlled impedance. For an unloaded bus (i.e., a bus with no attached intelligent peripheral devices), the intrinsic impedance ($Z_0$) can be calculated using the intrinsic impedance per unit length ($L_0$) and the intrinsic capacitance per unit length ($C_0$) in the following equation:

$$Z_0 = (L_0/C_0)^{1/2}$$

For a loaded bus, the preceding equation must be modified to reflect the effect of the attached load devices. This is most always in the form of added capacitance attributable to the attached load devices. Specifically, for a loaded bus the impedance (Z') (Z') can be calculated by modifying the preceding equation to include the load capacitance per unit length ($C_d$) resulting in the following equation:

$$Z' = (L_0/(C_0+C_d))^{1/2}$$

Based on this equation, it may be appreciated that increasing the load capacitance per unit length ($C_d$) will result in decreasing values for the loaded impedance (Z'). Unfortunately, in backplane architectures, the buses are relatively short with each load device being separated by a relatively short distance. Since each load device adds capacitance to the bus, there is a tendency for backplane architectures to have relatively high values for load capacitance per unit length ($C_d$). The result is that these architectures may be characterized by low intrinsic low values for impedance (Z'). Low values for impedance (Z') results in slow rise and fall times for signals within the bus. This degrades the performance of the bus, making it more prone to operational errors and electrical noise.

To overcome the degrading effects of decreasing impedance, designers have been faced with a difficult compromise. One possible solution is to increase the length of the bus included in backplane architectures. Typically this is achieved by increasing the effective distance that each signal must travel between adjacent intelligent peripheral devices. Unfortunately, this requires that the size of the backplane be increased or that each signal path be routed in a tortuous pattern between adjacent load devices. The use of a tortuous pattern increases the difficulty of routing the signal paths within the backplane and may require that additional signals layers be added to the backplane. In either case, the cost of the backplane can be increased significantly. Another possible solution is to decrease the clock speed of the bus. Of course, this negatively impacts the performance of the bus, thereby making this solution generally unacceptable.

As a result, there is a need for a low-cost, compact backplane that has acceptable electrical signal impedance characteristics and operates at acceptable clock speeds.

SUMMARY OF THE INVENTION

The present invention includes a printed circuit bus having enhanced signal impedance characteristics and a method for manufacturing busses of this type. The method of manufacturing begins by measuring, or calculating, values for the intrinsic impedance per unit length ($L_0$) and the intrinsic capacitance per unit length ($C_0$) of the bus. Both of these values correspond to the state of the bus in an unloaded state (i.e., with no attached load devices). Therefore, both of these values may be calculated from known properties of the materials being used to construct the bus. Alternatively, both values may be measured based on a test board.

Next, a value for the load capacitance per unit length ($C_d$) for bus is measured or calculated. $C_d$ is the capacitance, per unit length, that is attributable to the peripheral devices that will be attached to the bus. In general, this value may be selected to represent an average of the peripheral devices that are expected to be attached to bus. In other cases, a value that represents a specific set of load devices will be selected.

Based on the measured or calculated values for $L_0$, $C_0$ and $C_d$, distributed inductance ($L_d$) is calculated. Preferably, $L_d$ is calculated so that $L_d = L_0 * C_d/C_0$. $L_d$ represents the inductance, per unit length, that must be added to the bus to offset the load capacitance per unit length $C_d$ (i.e., the capacitance attributable to the load devices that will be attached to the bus).

The bus is then constructed so that each transmission line within the bus has an $L_d$ increase in inductance distributed along the transmission line. The transmission lines can be modified to increase the value of distributed inductance by $L_d$ by making geometric changes to the transmission lines, or by adding one inductor of $L_d$ inductance per bus load pitch (the distance between bus loads is defined as the pitch). Operationally, the inclusion of the distributed or discrete inductors causes the bus, when fully loaded, to have an impedance substantially equal to the intrinsic impedance (Zo). The result is that the drivers on the bus now drive the corrected impedance on the bus and signals within the bus have rise and fall times acceptable for operation at high clock speeds.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts. A standard industry SCSI bus is used in the example that is given. However, any bus can employ the principles of this invention.

Figure 1:
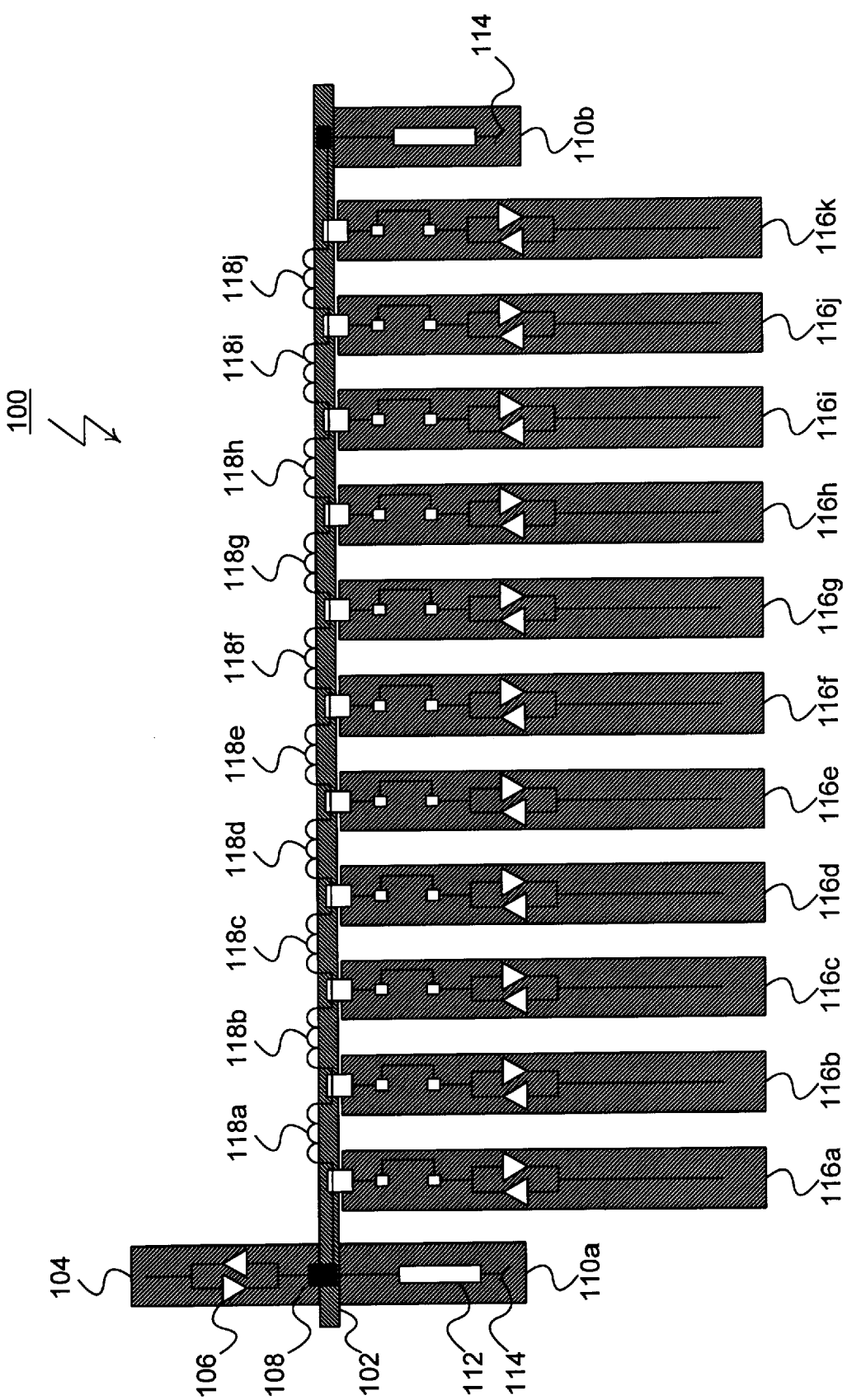
FIG. 1 is a block diagram of a SCSI bus according to a preferred embodiment of the environment for the present invention.

The present invention includes a SCSI bus having enhanced signal characteristics and a method for manufacturing busses of this type. In FIG. 1 a representative embodiment of the SCSI bus of the present invention is shown and generally designated 100. SCSI bus 100 includes a backplane 102. Backplane 102 is preferably a printed circuit board of the type well known to those familiar with electronic components.

SCSI initiator 104 is connected to backplane 102. The SCSI initiator represents a SCSI controller that connects SCSI bus 100 to a computer system or related device. The SCSI initiator 104 includes a SCSI I/O buffer 106 and is connected to backplane 102 using a connector 108.

SCSI terminators 110a and 110b are also connected to backplane 102. Each terminator 110 is a resistive device that terminates the bus into its intrinsic impedance ($Z_0$). As a result, terminators 110 reduce the likelihood that a signal will be reflected when it reaches the ends of SCSI bus 100. Reflected signals act as noise within SCSI bus 100 and are, therefore, undesirable. Each terminator 110 includes a 110 Ohm resistor 112 connected to a termination voltage source 114.

Figure 2:
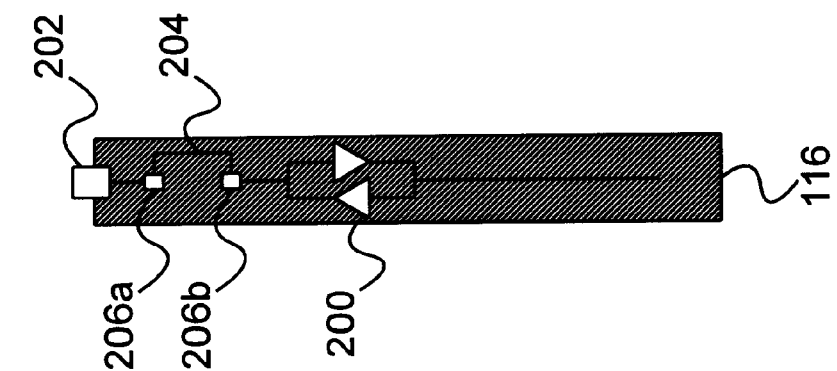
FIG. 2 is a block diagram of a customer replaceable unit as used in a preferred embodiment of the present invention.

A series of customer replaceable units (CRUs) 116a through 116k are connected to backplane 102. Each CRU 116 represents a SCSI peripheral device, such as a disk drive, tape drive, optical scanner or video adapter. For purposes of illustration, a representative CRU 116 is shown in FIG. 2 to include a SCSI I/O buffer 200. CRU 116 also includes a connector 202 for attaching CRU 116 to backplane 102. Between SCSI I/O buffer 200 and connector 202, CRU 116 includes a ribbon cable 204 having two connectors 206a and 206b. Ribbon cable 204 and connectors 206 form a flexible interconnection between connector 202 and SCSI I/O buffer 200.

Returning to FIG. 1, it may be seen that SCSI bus 100 includes a series of inductors 118a through 118j. Each inductor 118 is positioned between two adjacent CRUs 116. Functionally, each inductor 118 serves as a signal path between adjacent CRUs 116. Importantly, each inductor also serves to offset the capacitance added by CRUs 116 attached to SCSI bus 100. The nature of SCSI bus 100 requires a series of signal paths between each adjacent pair of CRUs 116. For example, for standard SCSI operation, there must be a total of eight signal paths for data transfer (data is transferred eight bits at a time, in parallel). Thus it may be appreciated that SCSI bus 100 will actually include a parallel array of inductors 118 between each pair of CRUs 116. For the sake of simplicity, however, FIG. 1 shows a single representative inductor 118 between each pair of CRUs 116.

Figure 3:
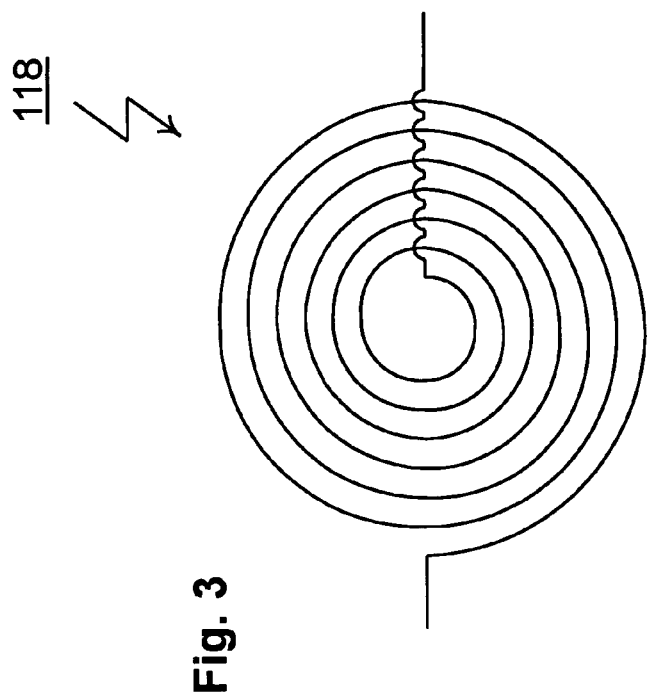
FIG. 3 is a block diagram of an inductor formed as a spiral trace in a printed circuit board backplane.

Inductors 118 may be implemented using several different techniques. For example, FIG. 3 shows a representative inductor 118 formed as a spiral trace within backplane 102. In cases where backplane 102 is sufficiently large, the spiral trace inductor 118 of FIG. 3 may be effectively employed. In many cases, however, it will be more advantageous to use surface mount inductors such as the SMT 1206 or 1210 varieties. Use of surface mount technology simplifies routing of backplane 102. In addition, surface mount inductors are generally smaller than spiral trace inductor 118. As a result, use of surface mount technology decreases the space required for the implementation of backplane 102.

To select the value for inductors 118, values for the intrinsic inductance per unit length ($L_0$) and the intrinsic capacitance per unit length ($C_0$) of SCSI bus 100 are measured or calculated. Both $L_0$ and $C_0$ correspond to the state of SCSI bus 100 in an unloaded state (i.e., with no attached CRUs 116). Therefore, both values may be calculated from known properties of the materials being used to construct SCSI bus 100. Alternatively, both values may be measured using a test board constructed using the same materials and method used in SCSI bus 100.

Next, a value for the load capacitance per unit length ($C_d$) of SCSI bus 100 is measured or calculated. $C_d$ is the capacitance, per unit length, that is attributable to CRUs 116. In general, calculation of $C_d$ depends on the nature and number of CRUs 116 that are to be attached to SCSI bus 100. In some cases, it will be appropriate to calculate $C_d$ to represent an average of the CRUs 116 that are expected be attached to SCSI bus 100 (i.e., an average number of CRUs 116 and an average range of CRU 116 types). In other cases, $C_d$ will be calculated to represent a specific set of CRUs 116.

Based on the measured or calculated values for $L_0$, $C_0$ and $C_d$, an adjustment inductance ($L_d$) is calculated. Preferably, $L_d$ is calculated so that $L_d$ is substantially equivalent to $L_0 * C_d/C_0$ (i.e., $L_d = L_0 * C_d/C_0$). $L_d$ represents the inductance, per unit length, that must be added to SCSI bus 100 to offset the load capacitance per unit length $C_d$ (i.e., the capacitance attributable to the peripheral devices that will be attached to SCSI bus 100). For SCSI bus 100, $L_d$ is the value chosen for inductors 118. Operationally, the inclusion of the inductors 118 causes SCSI bus 100, when fully loaded with CRUs 116, to have an intrinsic impedance substantially equal to the desired value of 110 Ohms. The result is that signals within SCSI bus 100 have rise and fall times acceptable for operation at high clock speeds. Specifically, for one preferred embodiment of the present invention, the inclusion of inductors 118 allows SCSI bus 100 to include eleven CRUs 116 spaced a 0.6 inch intervals and operating at ten megahertz clock speed (10 MHz).

Figure 4:
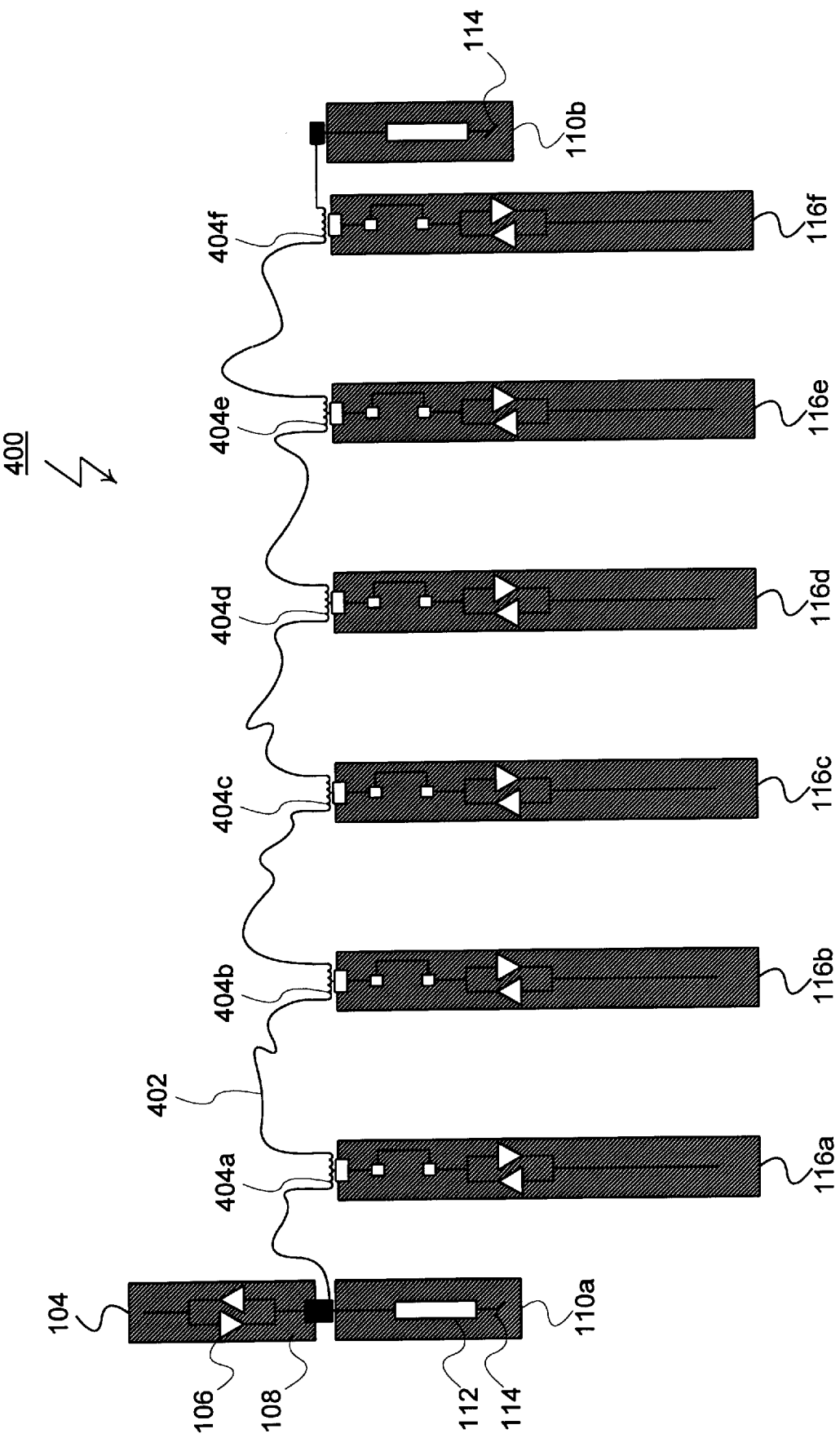
FIG. 4 is a block diagram of a ribbon cable SCSI bus according to a preferred embodiment of the environment for the present invention.

It should be appreciated that the above described method is applicable to a wide array of bus types and bus technologies. Thus, even though the described embodiment is a SCSI bus, other bus types may be enhanced using the described methodology. The present invention is also specifically applicable to non-backplane busses. As an example, FIG. 4 shows a SCSI bus 400 constructed using a ribbon cable 402. A series of CRUs 116a through 116f are attached at intervals along ribbon cable 402. SCSI bus 400 includes a series of inductors 404a through 404f. Each inductor 404 is positioned between two adjacent CRUs 116. Functionally, each inductor 404 serves to offset the capacitance added by CRUs 116 attached to SCSI bus 400. The value for inductors 400 is calculated using the same method as used in the case of SCSI bus 100. Thus, FIG. 4 represents the use of the present invention in the environment of a cable-type bus.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for manufacturing a bus having enhanced signal characteristics, the method comprising the following steps:

determining the intrinsic inductance per unit length ($L_0$) of the unloaded bus;

determining the intrinsic capacitance per unit length ($C_0$) of the unloaded bus;

determining the load capacitance per unit length ($C_d$) of the bus that is attributable to the peripheral devices that will be attached to the bus;

calculating a distributed inductance (Ld) per unit length for the bus; and adding inductance equal to the value of Ld to each unit length of each transmission line in the bus.

2. A method as recited in claim 1 wherein the value for Ld is calculated to be equal to $L_0 * C_d/C_0$.

3. A method as recited in claim 1 wherein the step of adding inductance further comprises the step of adding one inductor of value of Ld to each unit length of each transmission line with each inductor being formed as a spiral trace within a backplane used to form the bus.

4. A method as recited in claim 1 wherein the step of adding inductance further comprises the step of adding one inductor of value of Ld to each unit length of each transmission line with each inductor being a discrete component.

5. A method as recited in claim 1 wherein the step of adding inductance further comprises the step of fabricating each transmission line as an etched trace within a backplane used to form the bus with the trace having a width calculated to yield an inductance of Ld per each unit length of the transmission line.

6. A method as recited in claim 1 wherein $C_d$ is determined to reflect the average capacitance of a range of peripheral devices that may be attached to the bus.

7. A method as recited in claim 1 wherein $C_d$ is determined to reflect the capacitance of a specific set of peripheral devices that will be attached to the bus.

8. A method as recited in claim 1 wherein the bus is a SCSI bus.

9. A bus manufactured according to the method recited in claim 1.

10. A bus having enhanced signal characteristics, the bus comprising:

attachment means for connecting one or more load devices to the bus;

one or more transmission lines, each transmission line connecting, in series, the load devices attached to the bus; and and one inductor for each unit length of each transmission line, each inductor having a value Ld that is equal to $L_0 * C_d/C_0$, with $L_0$ being equal to the intrinsic inductance per unit length of the unloaded bus. $C_0$ being equal to the intrinsic capacitance per unit length of the unloaded bus and ($C_d$) being equal to the load capacitance per unit length of the bus that is attributable to the load devices that will be attached to the bus.

11. A bus as recited in claim 10 wherein the bus further comprises a backplane and wherein the inductors are added as spiral traces within the backplane.

12. A bus as recited in claim 10 wherein the bus further comprises a backplane and wherein the inductors are added as discrete components on the backplane.

13. A bus as recited in claim 10 wherein the bus further comprises a backplane and wherein the at least one transmission line is fabricated as an etched trace within the backplane with the trace having a width calculated to yield an inductance of $L_d$ per each unit length of the transmission line.

14. A bus as recited in claim 10 wherein $C_d$ is determined to reflect the average capacitance of a range of peripheral devices that may be attached to the bus.

15. A bus as recited in claim 10 wherein $C_d$ is determined to reflect the capacitance of a specific set of peripheral devices that will be attached to the bus.

16. A bus as recited in claim 10 wherein the bus is a SCSI bus.

* * * * *